US010752227B2

(12) United States Patent
Jung et al.

(10) Patent No.: US 10,752,227 B2
(45) Date of Patent: Aug. 25, 2020

(54) ELECTRONIC BRAKE SYSTEM

(71) Applicant: MANDO CORPORATION, Gyeonggi-do (KR)

(72) Inventors: Hee Chul Jung, Gyeonggi-do (KR); Seong Ho Choi, Gyeonggi-do (KR)

(73) Assignee: MANDO CORPORATION, Gyeonggi-Do (KR)

(*) Notice: Subject to any disclaimer, the term of this patent is extended or adjusted under 35 U.S.C. 154(b) by 0 days.

(21) Appl. No.: 16/147,566

(22) Filed: Sep. 28, 2018

(65) Prior Publication Data
US 2019/0100183 A1 Apr. 4, 2019

(30) Foreign Application Priority Data

Sep. 29, 2017 (KR) .................. 10-2017-0127720

(51) Int. Cl.
*B60T 8/17* (2006.01)
*B60T 13/58* (2006.01)
*B60T 13/68* (2006.01)
*B60T 13/16* (2006.01)
*B60T 8/40* (2006.01)
*B60T 7/04* (2006.01)
(Continued)

(52) U.S. Cl.
CPC .............. *B60T 13/58* (2013.01); *B60T 7/042* (2013.01); *B60T 8/17* (2013.01); *B60T 8/4081* (2013.01); *B60T 13/161* (2013.01); *B60T 13/166* (2013.01); *B60T 13/662* (2013.01); *B60T 13/686* (2013.01); *B60T 13/745* (2013.01); *B60T 2270/402* (2013.01); *B60T 2270/404* (2013.01); *B60T 2270/82* (2013.01)

(58) Field of Classification Search
CPC .......... B60T 7/042; B60T 8/17; B60T 8/4081; B60T 13/161; B60T 13/166; B60T 13/58; B60T 13/662; B60T 13/686; B60T 13/745
See application file for complete search history.

(56) References Cited

U.S. PATENT DOCUMENTS 6,412,882 B1 * 7/2002 Isono ...................... B60K 6/22
303/114.1
9,487,201 B2 * 11/2016 Linden .................. B60T 8/4018
(Continued)

FOREIGN PATENT DOCUMENTS

EP 2 520 473 11/2012

*Primary Examiner* — Thomas W Irvin
(74) *Attorney, Agent, or Firm* — Ladas & Perry, LLP

(57) ABSTRACT

Disclosed is an electronic brake system including: a reservoir to store oil; a master cylinder connected to the reservoir and including first and second master chambers and first and second piston provided in the first and second master chambers, respectively, to discharge the oil according to an pedal effort of a brake pedal; a hydraulic pressure generating apparatus provided on at least one of a first reservoir passage connecting the reservoir and the first master chamber and a second reservoir passage connecting the reservoir and the second master chamber; a hydraulic pressure supply apparatus operated by an electrical signal to generate a hydraulic pressure and connected to the master cylinder; and a hydraulic pressure control unit transmitting alternatively the hydraulic pressure discharged from the hydraulic pressure generating apparatus or the hydraulic pressure supply apparatus to a wheel cylinder provided on each of four wheels.

20 Claims, 6 Drawing Sheets

(51) Int. Cl.
*B60T 13/66* (2006.01)
*B60T 13/74* (2006.01)

(56) References Cited

U.S. PATENT DOCUMENTS

| | | | |
|---|---|---|---|
| 9,796,367 B2 * | 10/2017 | Miyata | B60T 13/141 |
| 9,988,031 B2 * | 6/2018 | Bauer | B60T 13/745 |
| 2013/0213025 A1 | 8/2013 | Linden | |
| 2016/0152223 A1 * | 6/2016 | Bauer | B60T 13/745 |
| | | | 303/14 |
| 2016/0200307 A1 * | 7/2016 | Feigel | B60T 8/4081 |
| | | | 303/6.01 |
| 2018/0229702 A1 * | 8/2018 | Son | B60T 8/4086 |
| 2019/0047529 A1 * | 2/2019 | Kim | B60T 13/62 |
| 2019/0152458 A1 * | 5/2019 | Akahane | B60T 13/662 |

\* cited by examiner

【Fig. 1】
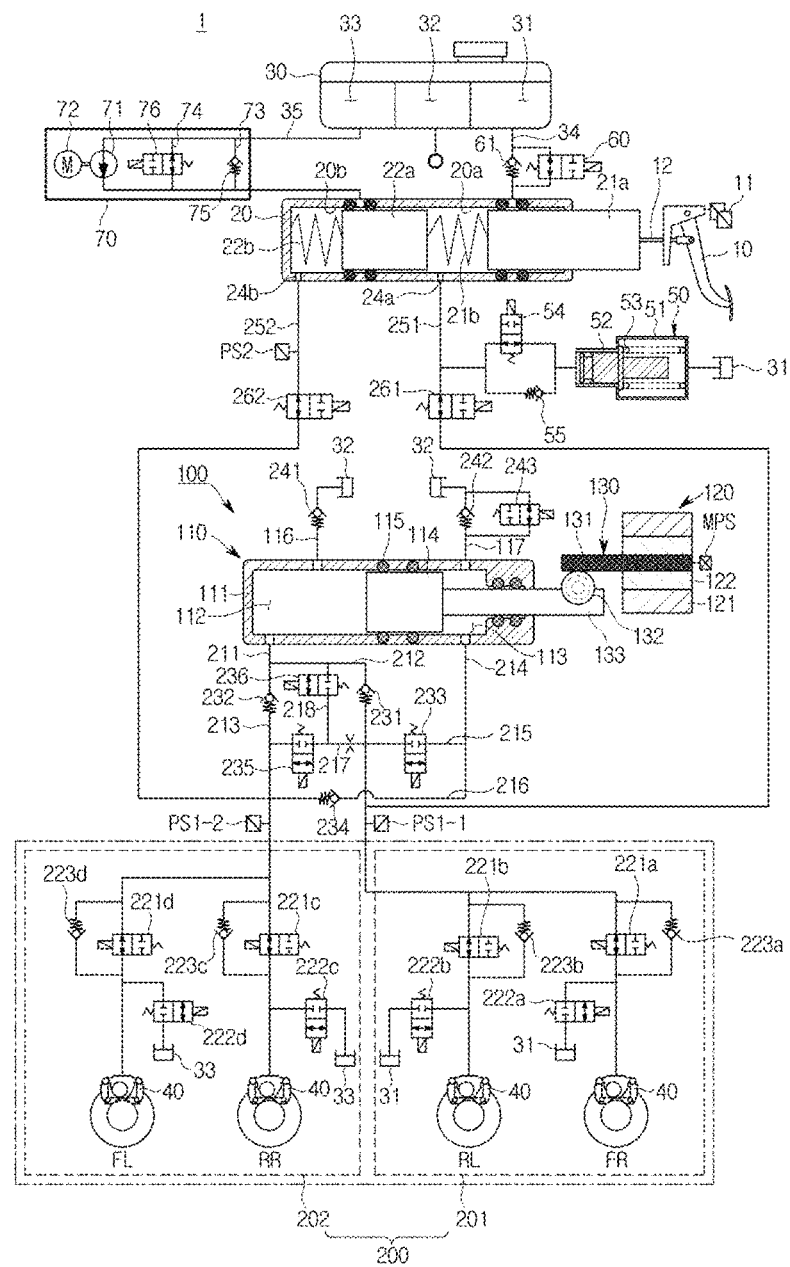

[Fig. 2]
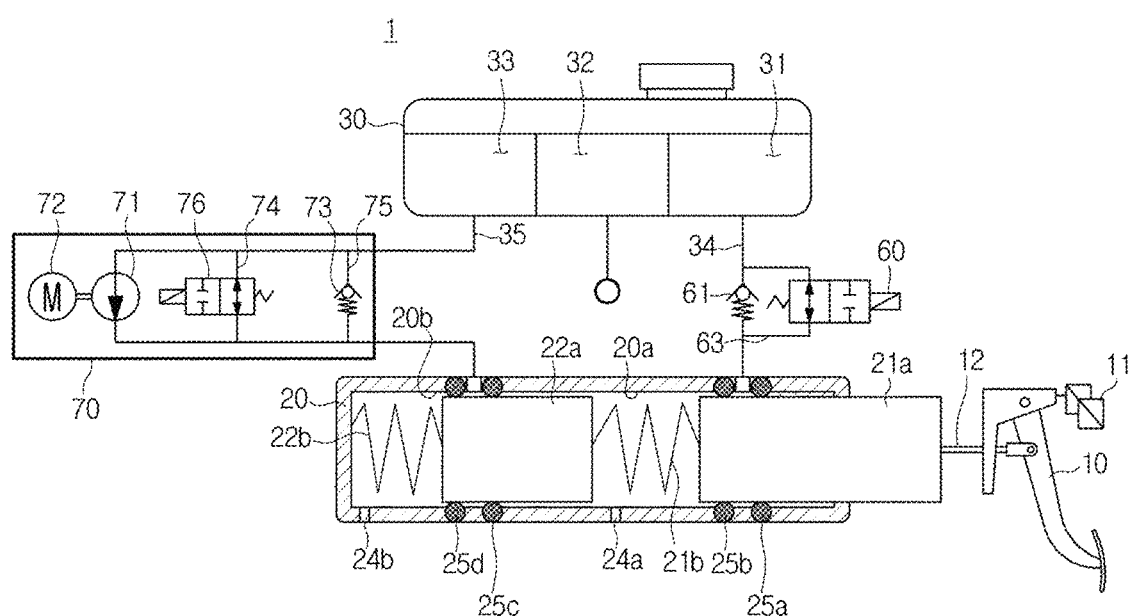

[Fig. 3]
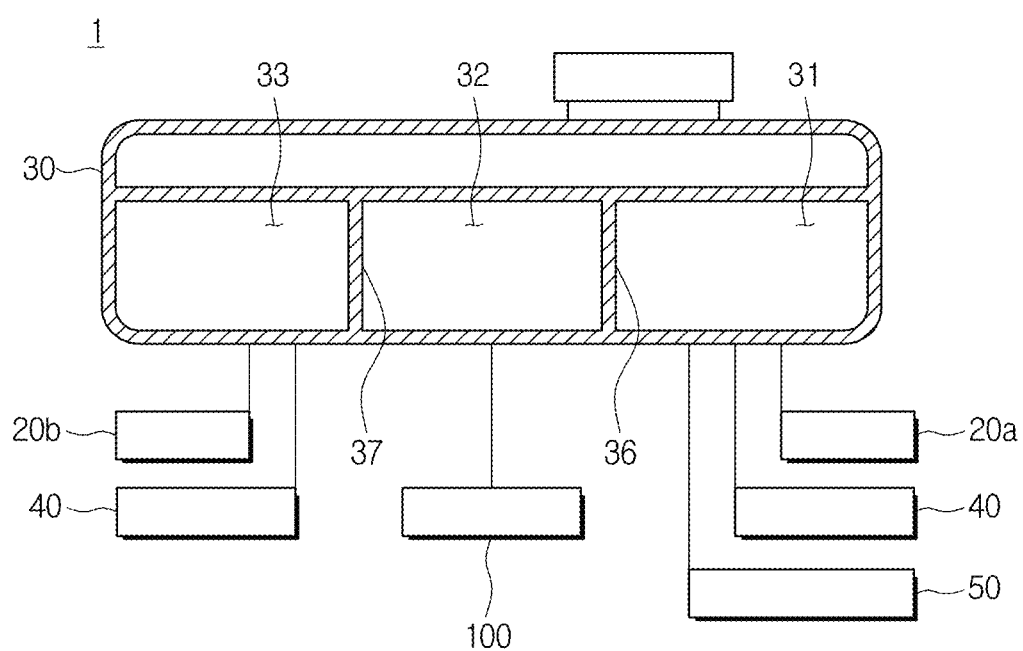

[Fig. 4]
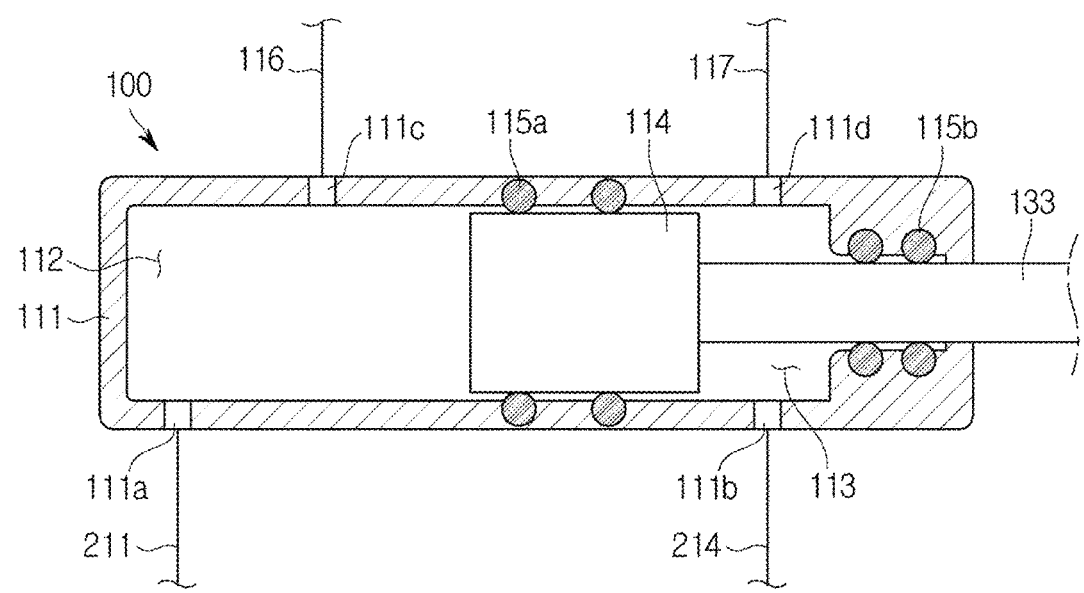

[Fig. 5]
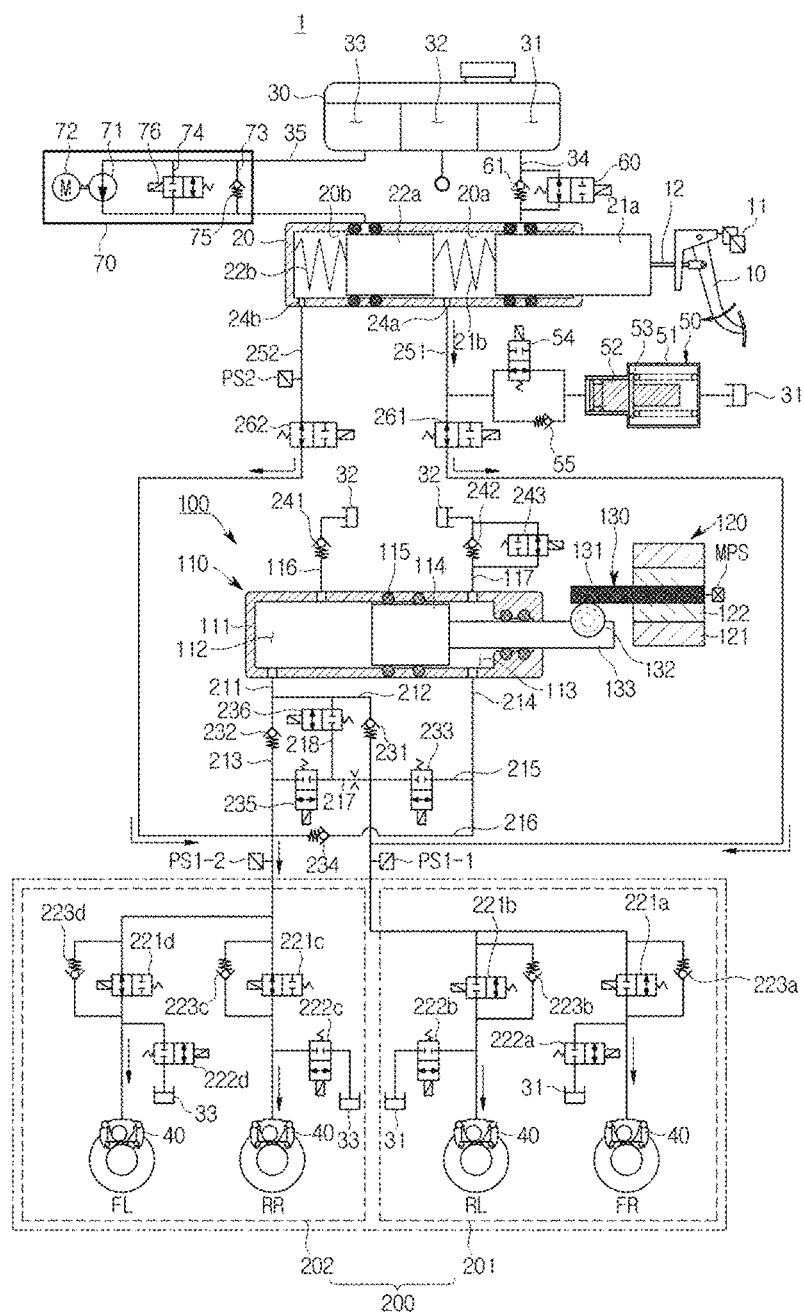

[Fig. 6]
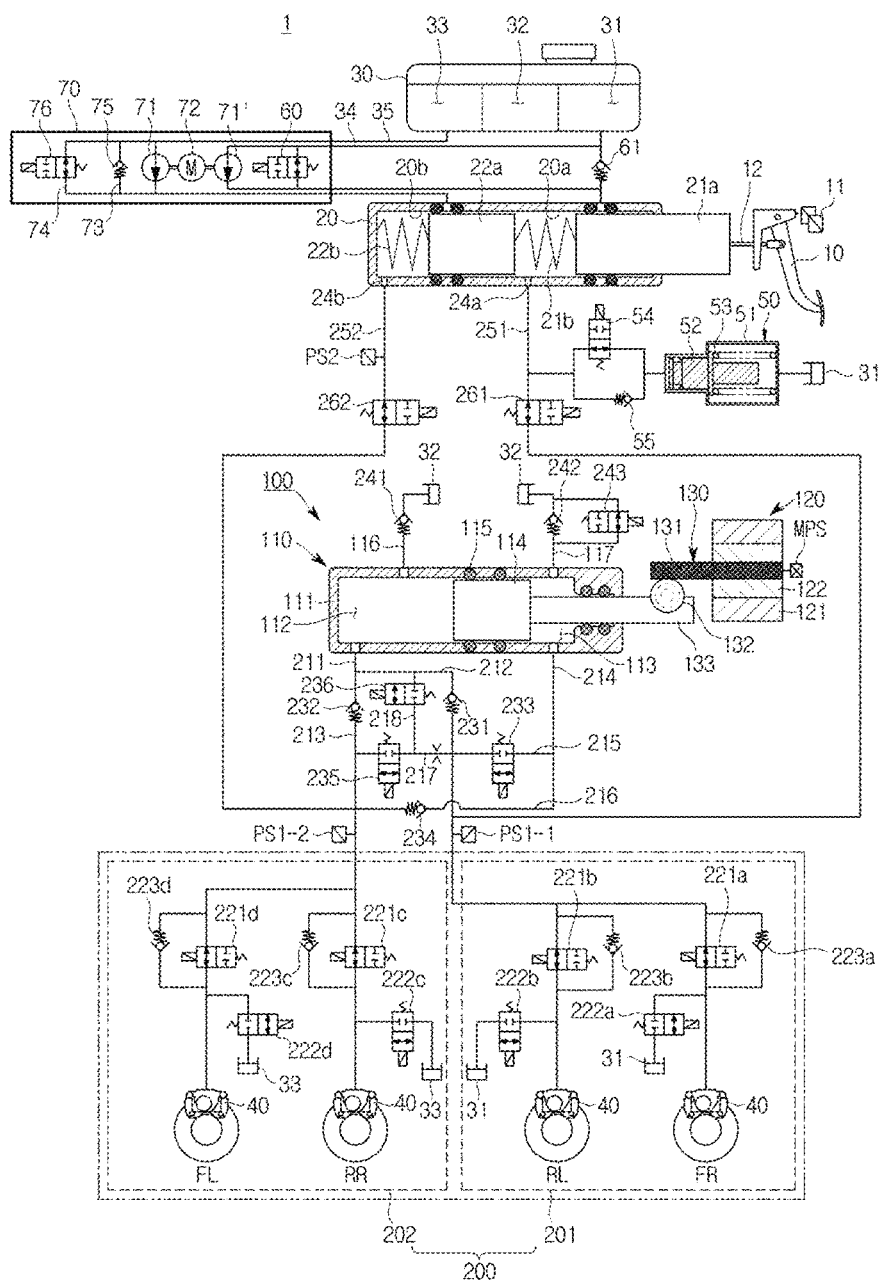

ELECTRONIC BRAKE SYSTEM

CROSS-REFERENCE TO RELATED APPLICATION(S)

This application is based on and claims priority under 35 U.S.C. § 119 to Korean Patent Application No. 10-2017-0127720, filed on Sep. 29, 2017 in the Korean Intellectual Property Office, the disclosure of which is incorporated by reference herein in its entirety.

BACKGROUND

1. Technical Field

The present disclosure relates to an electronic brake system, and more particularly, to an electronic brake system capable of quickly performing an alternative braking operation if an error occurs in a brake system that generates a braking force in accordance with an electrical signal.

2. Description of the Related Art

In general, a vehicle is essentially equipped with a brake system for braking, and in recent years, various types of brake systems have been proposed to obtain a more powerful and stable braking force.

For example, the brake system includes an anti-lock brake system (ABS) for preventing slippage of the wheels during braking, a brake traction control system (BTCS) for preventing the drive wheels from slipping when the vehicle suddenly starts or suddenly accelerates, an electronic stability control system (ESC) for stably maintaining the running state of the vehicle by controlling the brake hydraulic pressure by combining the anti-lock brake system and the traction control system, and the like.

In the conventional brake system, when the driver depresses the brake pedal, a hydraulic pressure necessary for braking is supplied to the wheel cylinder using a mechanically connected vacuum booster. However, in recent years, an electronic brake system including a hydraulic pressure supply apparatus, which receives an electric signal corresponding to the driver's braking will from a pedal displacement sensor that senses displacement of the brake pedal when the driver depresses the brake pedal and supplies the hydraulic pressure required for braking to the wheel cylinder, is widely used.

SUMMARY

It is an aspect of the present disclosure to provide an electronic brake system capable of quickly performing braking even if a system error occurs.

Additional aspects of the present disclosure will be set forth in part in the description which follows and, in part, will be obvious from the description, or may be learned by practice of the disclosure.

In accordance with one aspect of the present disclosure, there may be provided an electronic brake system including: a reservoir to store oil; a master cylinder connected to the reservoir and including first and second master chambers and first and second piston provided in the first and second master chambers, respectively, to discharge the oil according to an pedal effort of a brake pedal; a hydraulic pressure generating apparatus provided on at least one of a first reservoir passage connecting the reservoir and the first master chamber and a second reservoir passage connecting the reservoir and the second master chamber; a hydraulic pressure supply apparatus operated by an electrical signal to generate a hydraulic pressure and connected to the master cylinder; and a hydraulic pressure control unit transmitting alternatively the hydraulic pressure discharged from the hydraulic pressure generating apparatus or the hydraulic pressure supply apparatus to a wheel cylinder provided on each of four wheels.

Further, the hydraulic pressure supply apparatus may include: a motor and a pump operated by the motor and provided on at least one of the first reservoir passage and the second reservoir passage; a first bypass passage connecting a front side and a rear side of the pump; a second bypass passage connecting the front side and the rear side of the pump; a solenoid valve provided on one of the first bypass passage and the second bypass passage; and a check valve provided on the other one of the first bypass passage and the second bypass passage to allow the flow of oil from the reservoir to the master cylinder and block the flow of oil from the master cylinder to the reservoir.

Further, a pump may be provided on each of the first reservoir passage and the second reservoir passage, and the pumps may be driven by a single motor.

Further, the solenoid valve may be provided as a normally open type valve which is opened in a normal state, and may be operated to be closed during the operation of the pump.

Further, the hydraulic pressure generating apparatus may be provided on the second reservoir passage.

Further, a check valve and an inspection valve for an inspection mode may be provided on the first reservoir passage.

Further, the solenoid valve of the hydraulic pressure generating apparatus may be provided as a normally open type valve which is opened in a normal state and perform an inspection mode by a closing operation.

Further, the hydraulic control unit may be separately provided with a first hydraulic circuit and a second hydraulic circuit for transmitting hydraulic pressure discharged from the hydraulic pressure supply apparatus to wheel cylinders provided on two wheels respectively, the reservoir may include a first reservoir chamber connected to recover oil dumped from the first hydraulic circuit, a second reservoir chamber connected to supply oil to the hydraulic pressure supply apparatus, and a third reservoir chamber connected to recover oil dumped from the second hydraulic circuit, and the first reservoir chamber and the third reservoir chamber may be separately provided from each other.

Further, the first reservoir chamber may be connected with the first reservoir passage, and the third reservoir chamber may be connected with the second reservoir passage.

Further, when the electronic brake system operates normally the hydraulic pressure discharged from the hydraulic pressure supply apparatus may be transmitted to the wheel cylinder, when the electronic brake system operates abnormally the hydraulic pressure discharged from the hydraulic pressure generating apparatus may be transmitted to the wheel cylinder.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 1 is a hydraulic circuit diagram showing a non-braking state of an electronic brake system according to an embodiment of the present disclosure;

FIG. 2 is an enlarged view showing a master cylinder according to an embodiment of the present disclosure;

FIG. 3 is an enlarged view showing a connection relationship between a reservoir and a hydraulic circuit according to an embodiment of the present disclosure;

FIG. 4 is an enlarged view showing a hydraulic pressure providing unit according to an embodiment of the present disclosure;

FIG. 5 is a hydraulic circuit diagram for explaining braking operation of one of two hydraulic circuits by using a hydraulic pressure generating apparatus if an error occurs in an electronic brake system according to an embodiment of the present disclosure; and FIG. 6 is a hydraulic circuit diagram for explaining braking operation of two hydraulic circuits by using a hydraulic pressure generating apparatus if an error occurs in an electronic brake system according to another embodiment of the present disclosure.

DETAILED DESCRIPTION

Hereinafter, embodiments of the present disclosure will be described in detail with reference to the accompanying drawings. The following embodiments are provided to fully convey the spirit of the present disclosure to a person having ordinary skill in the art to which the present disclosure belongs. The present disclosure is not limited to the embodiments shown herein but may be embodied in other forms. The drawings are not intended to limit the scope of the present disclosure in any way, and the size of components may be exaggerated for clarity of illustration. Like reference numerals designate like elements throughout the specification.

FIG. 1 is a hydraulic circuit diagram showing a non-braking state of an electronic brake system according to an embodiment of the present disclosure.

Referring to FIG. 1, an electronic brake system 1 typically includes a master cylinder 20 for generating a hydraulic pressure, a reservoir 30 coupled to an upper portion of the master cylinder 20 to store oil, an input rod 12 for pressing the master cylinder 20 in accordance with a pedal effort of the brake pedal 10, wheel cylinders 40 that receive the hydraulic pressure and perform braking of each of wheels FL, RR, RL, and FR, a pedal displacement sensor 11 for sensing the displacement of the brake pedal 10, and a simulation apparatus 50 for providing a reaction force in accordance with the pedal effort of the brake pedal 10.

The master cylinder 20 may be configured to include at least one chamber to generate hydraulic pressure. As an example, the master cylinder 20 may include a first master chamber 20a and a second master chamber 20b.

Next, the master cylinder 20 according to an embodiment of the present disclosure will be described with reference to FIG. 2. FIG. 2 is an enlarged view showing the master cylinder 20 according to an embodiment of the present disclosure.

The first master chamber 20a is provided with a first piston 21a connected to the input rod 12 and the second master chamber 20b is provided with a second piston 22a. The first master chamber 20a communicates with a first hydraulic pressure port 24a to allow the oil to flow in and out and the second master chamber 20b communicates with a second hydraulic pressure port 24b to allow the oil to flow in and out. For example, the first hydraulic pressure port 24a may be connected to a first backup passage 251, and the second hydraulic pressure port 24b may be connected to a second backup passage 252.

The master cylinder 20 has the two master chambers 20a and 20b to ensure safety in case of failure. For example, one master chamber 20a of the two master chambers 20a and 20b may be connected to the front right wheel FR and the rear left wheel RL of a vehicle through the first backup passage 251, and the other master chamber 20b may be connected to the front left wheel FL and the rear right wheel RR through the second backup passage 252. In this way, by independently configuring the two master chambers 20a and 20b, it is possible to brake the vehicle even if one of the master chambers fails.

Alternatively, unlike the drawing, one of the two master chambers may be connected to the two front wheels FR and FL, and the other master chamber may be connected to the two rear wheels RR and RL. In addition, one of the two master chambers may be connected to the front left wheel FL and the rear left wheel RL, and the other master chamber may be connected to the rear right wheel RR and the front right wheel FR. That is, the positions of the wheels connected to the master chambers of the master cylinder 20 may be variously configured.

A first spring 21b may be provided between the first piston 21a and the second piston 22a of the master cylinder 20, and a second spring 22b may be provided between the second piston 22a and an end of the master cylinder 20. That is, the first spring 21b may be accommodated in the first master chamber 20a, and the second spring 22b may be accommodated in the second master chamber 20b.

The first spring 21b and the second spring 22b are compressed by the first piston 21a and the second piston 22a which move as the displacement of the brake pedal 10 changes, so that the elastic force is stored. When the pushing force of the first piston 21a becomes smaller than the elastic force, the first and second pistons 21a and 22a may be returned to the original state by using the restoring elastic force stored in the first spring 21b and the second spring 22b.

The input rod 12 for pressing the first piston 21a of the master cylinder 20 may be brought into close contact with the first piston 21a. That is, a gap between the master cylinder 20 and the input rod 12 may not exist. Therefore, when the brake pedal 10 is depressed, the master cylinder 20 may be directly pressed without a pedal invalid stroke section.

The first master chamber 20a may be connected to the reservoir 30 through a first reservoir passage 34 and the second master chamber 20b may be connected to the reservoir 30 through a second reservoir passage 35.

The master cylinder 20 may include two sealing members 25a and 25b disposed on the front and rear sides of the first reservoir passage 34 and two sealing members 25c and 25d disposed on the front and rear sides of the second reservoir passage 35. The sealing members 25a, 25b, 25c and 25d may be in the form of a ring protruding from the inner wall of the master cylinder 20 or the outer peripheral surface of the first and second pistons 21a and 22a.

A check valve 61, which allows the flow of oil flowing from the reservoir 30 to the first master chamber 20a while blocking the flow of oil flowing into the reservoir 30 from the first master chamber 20a, may be provided on the first reservoir passage 34. That is, the check valve 61 may be provided to allow only one directional fluid flow. The front and rear of the check valve 61 of the first reservoir passage 34 may be connected by a bypass passage 63. An inspection valve 60 may be provided on the bypass flow passage 63.

The inspection valve 60 may be provided as a bidirectional control valve for controlling the flow of oil between the reservoir 30 and the master cylinder 20. The inspection valve 60 may be provided as a normally open type solenoid valve that operates to be closed when receiving a closing signal from an electronic control unit in a normally open state. The specific function and operation of the inspection valve 60 will be described later.

The second reservoir passage 35 may be provided with a hydraulic pressure generating apparatus 70 so that braking can be performed quickly as an auxiliary in the event of a system malfunction.

The hydraulic pressure generating apparatus 70 includes a pump 71 provided on the second reservoir passage 35 and a motor 72 for driving the pump 71, and a check valve 75 and a solenoid valve 76 provided respectively in the first bypass passage 73 and the second bypass passage 74 that connect a front side and a rear side of the pump 71. The pump 71 and the motor 72 are components of a general actuator used in a brake system, and thus detailed description thereof will be omitted.

The first bypass passage 73 connects the front and rear sides of the pump 71 provided on the second reservoir passage 35. The first bypass passage 73 may be provided with a check valve 75 that allows only a one-way fluid flow. That is, as shown in FIG. 2, the check valve 75 may be provided so as to block the flow of oil flowing into the reservoir 30 from the second master chamber 20*b* while allowing the flow of oil flowing from the reservoir 30 to the second master chamber 20*b*.

The second bypass passage 74 connects the front and rear sides of the pump 71 provided on the second reservoir passage 35. The second bypass passage 74 may be provided with a solenoid valve 76 as a bidirectional control valve for controlling the flow of oil between the reservoir 30 and the master cylinder 20. The solenoid valve 76 may be provided as a normally open type solenoid valve that operates to be closed when receiving a closing signal from the electronic control unit in a normally open state.

As described above, the pump 71, the check valve 75, and the solenoid valve 76 may be installed in parallel on the second reservoir passage 35. The specific function and operation of the hydraulic pressure generating apparatus 70 will be described later.

FIG. 3 is a schematic view showing a connection relationship between the reservoir 30 and a hydraulic circuit in which wheel cylinders 40 are included. As shown in FIG. 3, the reservoir 30 according to the present embodiment may include three reservoir chambers 31, 32 and 33, and the three reservoir chambers 31, 32 and 33 may be arranged side by side in a row.

The adjacent reservoir chambers 31, 32 and 33 may be partitioned by partition 36 and 37. For example, the first reservoir chamber 31 and the second reservoir chamber 32 are partitioned by the first partition 36, and the second reservoir chamber 32 and the third reservoir chamber 33 are partitioned by the second partition 37.

The first partition 36 and the second partition 37 may be partially opened to allow the first to third reservoir chambers 31, 32 and 33 to communicate with each other. Therefore, the pressures of the first to third reservoir chambers 31, 32 and 33 may all be the same, and the pressures of the first to third reservoir chambers 31, 32 and 33 may be formed at atmospheric pressure.

The first reservoir chamber 31 may be connected to the first master chamber 20*a* of the master cylinder 20, the wheel cylinders 40 and the simulation apparatus 50.

That is, the first reservoir chamber 31 may be connected to the first master chamber 20*a* through the first reservoir passage 34, and may be connected to two wheel cylinders of the four wheel cylinders 40, as an example, to the wheel cylinders 40 of a first hydraulic circuit 201 provided on the front right wheel FR and the rear left wheel RL.

As shown in FIG. 1, the connection between the first reservoir chamber 31 and the first master chamber 20*a* may be controlled by the check valve 61 and the inspection valve 60, the connection between the first reservoir chamber 31 and the simulation apparatus 50 may be controlled by a simulator valve 54 and a simulator check valve 55, and the connection between the first reservoir chamber 31 and the wheel cylinders 40 may be controlled by first and second outlet valves 222*a* and 222*b*.

The second reservoir chamber 32 may be connected to a hydraulic pressure supply apparatus 100. Referring to FIGS. 1 and 3, the second reservoir chamber 32 may be connected to a first pressure chamber 112 and a second pressure chamber 113 of a hydraulic pressure providing unit 110. Specifically, the second reservoir chamber 32 may be connected to the first pressure chamber 112 through a first dump passage 116 and to the second pressure chamber 113 through a second dump passage 117. Alternatively, unlike the drawings, the second reservoir chamber 32 may be connected to various hydraulic pressure supply apparatuses. As an example, the second reservoir chamber 32 may be connected to a pump.

The third reservoir chamber 33 may be connected to the second master chamber 20*b* of the master cylinder 20 and the wheel cylinders 40. Referring to FIG. 1, the third reservoir chamber 33 may be connected to the second master chamber 20*b* through the second reservoir passage 35, and may also be connected to the wheel cylinders of a second hydraulic circuit 202 provided on the other two wheel cylinders of the four wheel cylinders 40, as an example, to the wheel cylinders 40 of the second hydraulic circuit 202 provided on the rear right wheel RR and the front left wheel FL. The connection between the third reservoir chamber 33 and the wheel cylinders 40 may be controlled by third and fourth outlet valves 222*c* and 222*d*.

According to the present embodiment, the reservoir 30 may be configured such that the second reservoir chamber 32 that is connected to the hydraulic pressure supply apparatus 100 and the first and third reservoir chambers 31 and 33 that are connected to the first and second master chambers 20*a* and 20*b* are separated from each other. This is because that if the reservoir chamber for supplying oil to the hydraulic pressure supply apparatus 100 and the reservoir chambers for supplying oil to the first and second master chambers 20*a* and 20*b* are provided in the same manner, the reservoir 20 also does not properly supply oil to the first and second master chambers 20*a* and 20*b* when the reservoir 20 fails to properly supply oil to the hydraulic pressure supply apparatus 100.

Accordingly, the reservoir 30 is provided such that the second reservoir chamber 32 and the first and third reservoir chambers 31 and 33 are separated from each other, so that in an emergency in which oil cannot be properly supplied to the hydraulic pressure supply apparatus 100, the reservoir 30 may supply oil normally to the first and second master chambers 20*a* and 20*b* so that emergency braking can be performed.

Further, according to an embodiment of the present disclosure, the reservoir 30 may be provided such that the first reservoir chamber 31 connected to the first master chamber 20*a* and the third reservoir chamber 33 connected to the second master chamber 20b are separated from each other. This is because that if the reservoir chamber for supplying oil to the first master chamber 20a and the reservoir chamber for supplying oil to the second master chamber 20b are provided in the same manner, the reservoir 20 also cannot properly supply oil to the second master chamber 20b if the reservoir 20 fails to properly supply oil to the first master chamber 20a.

Accordingly, the reservoir 30 is provided such that the first reservoir chamber 31 and the third reservoir chamber 33 are separated from each other, so that in an emergency in which oil cannot be properly supplied to the first master chamber 20a, the reservoir 30 may supply oil normally to the second master chamber 20b so that a braking pressure may be formed in two wheel cylinders of the four wheel cylinders 40.

Further, the reservoir 30 may be provided such that an oil line connected to the reservoir 30 from the hydraulic pressure supply apparatus 100 and a dump line connected to the reservoir 30 from the wheel cylinders 40 are separated from each other.

Therefore, it is possible to prevent bubbles, which may occur in the dump line at the time of the ABS braking, from flowing into the first and second pressure chambers 112 and 113 of the hydraulic pressure supply apparatus 100, thereby preventing the ABS performance from being degraded.

Meanwhile, the simulation apparatus 50 may be connected to the first backup passage 251, which will be described later, to provide a reaction force in accordance with the pedal effort of the brake pedal 10. The reaction force is provided as much as compensating the pedal effort provided by a driver through the simulation apparatus 50 so that the driver may finely regulate the braking force as intended.

Referring to FIG. 1, the simulation apparatus 50 includes a pedal simulator that has a simulation chamber 51 provided to store the oil flowing out from the first hydraulic pressure port 24a of the master cylinder 20, a reaction force piston 52 provided in the simulation chamber 51 and a reaction force spring 53 elastically supporting the reaction force piston 52, and the simulator valve 54 connected to a front portion of the simulation chamber 51.

The reaction force piston 52 and the reaction force spring 53 are installed so as to have a certain range of displacement in the simulation chamber 51 by the oil introduced into the simulation chamber 51.

The reaction force spring 53 shown in the drawing is only one embodiment capable of providing an elastic force to the reaction force piston 52 and may include various embodiments capable of storing the elastic force by deforming the shape. As an example, the reaction force spring 53 includes various members capable of storing an elastic force by being made of a material such as rubber or having a coil or a plate shape.

The simulator valve 54 may connect the master cylinder 20 and the front portion of the simulation chamber 51, and a rear portion of the simulation chamber 51 may be connected to the reservoir 30. Therefore, even when the reaction force piston 52 is returned, the oil in the reservoir 30 inflows through the simulation valve 51, so that the entire interior of the simulation chamber 51 may be filled with the oil.

The simulator valve 54 may be configured as a normally closed type solenoid valve that is normally kept closed. The simulator valve 54 may be opened when a driver presses the brake pedal 10 to deliver the oil in the simulation chamber 51 to the reservoir 30.

Further, the simulator valve 54 may be provided with the simulator check valve 55 in parallel. The simulator check valve 55 may ensure a quick return of the pedal simulator pressure when the brake pedal 10 is released.

The operation of the pedal simulation apparatus 50 will be briefly described below. When a driver depresses the brake pedal 10, the oil in the simulation chamber 51 is transmitted to the reservoir 30 as the reaction force piston 52 of the pedal simulator pushes the reaction force spring 53, and the driver is provided with a sense of pedaling in this process. On the contrary, when the driver releases the pedal effort applied to the brake pedal 10, the reaction force spring 53 pushes the reaction force piston 52 to be returned to the original state, and the oil in the reservoir 30 may flow into the simulation chamber 51 to fully fill the inside of the simulation chamber 51.

As such, since the inside of the simulation chamber 51 is always filled with oil, the friction of the reaction force piston 52 is minimized during operation of the simulation apparatus 50 so that the durability of the simulation apparatus 50 may be improved and the inflow of foreign matter from the outside may be blocked.

The electronic brake system 1 according to an embodiment of the present disclosure may include the hydraulic pressure supply apparatus 100 which mechanically operates by receiving an electric signal of a driver's braking will from the pedal displacement sensor 11 which detects the displacement of the brake pedal 10, a hydraulic control unit 200 composed of the first and second hydraulic circuits 201 and 202 for controlling the flow of hydraulic pressure transmitted to the wheel cylinders 40 provided on the two wheels FR and RL or FL and RR, a first cut valve 261 provided on the first backup passage 251 that connects the first hydraulic pressure port 24a and the first hydraulic circuit 201 to control the flow of hydraulic pressure, a second cut valve 262 provided on the second backup passage 252 that connects the second hydraulic pressure port 24b and the second hydraulic circuit 202 to control the flow of hydraulic pressure, and an electronic control unit (ECU; not shown) for controlling the hydraulic pressure supply apparatus 100 and valves 54, 60, 76 221a. 221b, 221c, 221d, 222a, 222b, 222c, 222d, 233, 235, 236 and 243 based on hydraulic pressure information and pedal displacement information.

The hydraulic pressure supply apparatus 100 may include the hydraulic pressure providing unit 110 for providing oil pressure delivered to the wheel cylinders 40, a motor 120 for generating a rotational force by an electrical signal of the pedal displacement sensor 11, and a power converting unit 130 for converting the rotational motion of the motor 120 into a linear motion and transmitting the linear motion to the hydraulic pressure providing unit 110. Alternatively, the hydraulic pressure providing unit 110 may be operated by the pressure supplied from a high pressure accumulator, not by the driving force supplied from the motor 120.

Next, the hydraulic pressure providing unit 110 according to an embodiment of the present disclosure will be described with reference to FIG. 4. FIG. 4 is an enlarged view showing the hydraulic pressure providing unit 110 according to an embodiment of the present disclosure.

The hydraulic pressure providing unit 110 includes a cylinder block 111 in which a pressure chamber for receiving and storing oil is formed, a hydraulic piston 114 accommodated in the cylinder block 111, sealing members 115 (115a, 115b) provided between the hydraulic piston 114 and the cylinder block 111 to seal pressure chambers, and a drive shaft 133 connected to the rear end of the hydraulic piston 114 to transmit the power output from the power converting unit 130 to the hydraulic piston 114.

The pressure chambers may include the first pressure chamber 112 positioned forward (forward direction, leftward direction in the drawing) of the hydraulic piston 114 and the second pressure chamber 113 positioned rearward (rearward direction, rightward in the drawing) of the hydraulic piston 114. That is, the first pressure chamber 112 is partitioned by the cylinder block 111 and the front end of the hydraulic piston 114 and is provided such that the volume thereof changes according to the movement of the hydraulic piston 114, and the second pressure chamber 113 is partitioned by the cylinder block 111 and the rear end of the hydraulic piston 114 and is provided such that the volume thereof changes according to the movement of the hydraulic piston 114.

The first pressure chamber 112 is connected to a first hydraulic passage 211 through a first communication hole 111a formed at the rear side of the cylinder block 111 and is connected to a fourth hydraulic passage 214 through a second communication hole 111b formed at the front side of the cylinder block 111. The first hydraulic passage 211 connects the first pressure chamber 112 and the first and second hydraulic circuits 201 and 202. In addition, the first hydraulic passage 211 is branched to a second hydraulic passage 212 communicating with the first hydraulic circuit 201 and a third hydraulic passage 213 communicating with the second hydraulic circuit 202. The fourth hydraulic passage 214 connects the second pressure chamber 113 and the first and second hydraulic circuits 201 and 202. In addition, the fourth hydraulic passage 214 is branched to a fifth hydraulic passage 215 communicating with the first hydraulic circuit 201 and a sixth hydraulic passage 216 communicating with the second hydraulic circuit 202.

The sealing members 115 include a piston sealing member 115a provided between the hydraulic piston 114 and the cylinder block 111 to seal a gap between the first pressure chamber 112 and the second pressure chamber 113, and a drive shaft sealing member 115b provided between the drive shaft 133 and the cylinder block 111 to seal a gap between the second pressure chamber 113 and the cylinder block 111. That is, the hydraulic pressure or the negative pressure of the first pressure chamber 112 generated by the forward or backward movement of the hydraulic piston 114 may not be leaked to the second pressure chamber 113 by blocking by the piston sealing member 115a, and may be transmitted to the first and fourth hydraulic passages 211 and 214. In addition, the hydraulic pressure or the negative pressure of the second pressure chamber 113 generated by the forward or backward movement of the hydraulic piston 114 may not be leaked to the cylinder block 111 by blocking by the drive shaft sealing member 115b.

The first and second pressure chambers 112 and 113 are connected to the reservoir 30 by the dump passages 116 and 117, respectively, so that the first and second pressure chambers 112 and 113 may receive and store oil from the reservoir 30, or the oil in the first pressure chamber 112 or the second pressure chamber 113 may be delivered to the reservoir 30. As an example, the dump passages 116 and 117 may include the first dump passage 116 branched from the first pressure chamber 112 and connected to the reservoir 30, and the second dump passage 117 branched from the second pressure chamber 113 and connected to the reservoir 30.

Further, the first pressure chamber 112 is connected to the first dump passage 116 through a third communication hole 111c formed on the front side thereof, and the second pressure chamber 113 is connected to the second dump passage 117 through a fourth communication hole 111d formed on the rear side thereof.

Flow passages 211 to 217 and valves 231 to 236 and 241 to 243, which are connected to the first pressure chamber 112 and the second pressure chamber 113, will be described below with reference to FIG. 1.

The second hydraulic passage 212 may communicate with the first hydraulic circuit 201, and the third hydraulic passage 213 may communicate with the second hydraulic circuit 202. Accordingly, the hydraulic pressure may be transmitted to the first hydraulic circuit 201 and the second hydraulic circuit 202 by advancing the hydraulic piston 114.

Further, the electronic brake system 1 according to an embodiment of the present disclosure may include a first control valve 231 and a second control valve 232 provided on the second and third hydraulic passages 212 and 213, respectively, to control the flow of oil.

The first and second control valves 231 and 232 may be provided as check valves that allow only the oil flow in the direction from the first pressure chamber 112 to the first or second hydraulic circuit 201 or 202 and block the oil flow in the opposite direction. That is, the first or second control valve 231 or 232 may allow the hydraulic pressure of the first pressure chamber 112 to be transmitted to the first or second hydraulic circuit 201 or 202, but may prevent the hydraulic pressure of the first or second hydraulic circuit 201 or 202 from being leaked to the first pressure chamber 112 through the second or third hydraulic passage 212 or 213.

The fourth hydraulic passage 214 may be branched into the fifth hydraulic passage 215 and the sixth hydraulic passage 216 to communicate with both the first hydraulic circuit 201 and the second hydraulic circuit 202. As an example, the fifth hydraulic passage 215 branched from the fourth hydraulic passage 214 may communicate with the first hydraulic circuit 201, and the sixth hydraulic passage 216 branched from the fourth hydraulic passage 214 may communicate with the second hydraulic circuit 202. Accordingly, the hydraulic pressure may be transmitted to both the first hydraulic circuit 201 and the second hydraulic circuit 202 by the backward movement of the hydraulic piston 114.

Further, the electronic brake system 1 according to an embodiment of the present disclosure may include a third control valve 233 provided on the fifth hydraulic passage 215 to control the flow of oil, and a fourth control valve 234 provided on the sixth hydraulic passage 216 to control the flow of oil.

The third control valve 233 may be provided as a bidirectional control valve for controlling the oil flow between the second pressure chamber 113 and the first hydraulic circuit 201. In addition, the third control valve 233 may be provided as a normally closed type solenoid valve that operates to be opened when receiving an open signal from the electronic control unit in a normally closed state.

The fourth control valve 234 may be provided as a check valve that allows only the oil flow in the direction from the second pressure chamber 113 to the second hydraulic circuit 202 and blocks the oil flow in the opposite direction. That is, the fourth control valve 234 may prevent the hydraulic pressure in the second hydraulic circuit 202 from being leaked to the second pressure chamber 113 through the sixth hydraulic passage 216 and the fourth hydraulic passage 214.

Further, the electronic brake system 1 according to an embodiment of the present disclosure may include a fifth control valve 235 provided on a seventh hydraulic passage 217 that connects the second hydraulic passage 212 and the third hydraulic passage 213 to control the flow of oil, and a sixth control valve 236 provided on an eighth hydraulic passage 218 that connects the second hydraulic passage 212 and the seventh hydraulic passage 217 to control the flow of oil. The fifth control valve 235 and the sixth control valve 236 may be provided as a normally closed type solenoid valve that operates to be opened when receiving an open signal from the electronic control unit that operates to be opened when receiving an open signal from the electronic control unit in a normally closed state.

The fifth control valve 235 and the sixth control valve 236 may operate to be opened when an abnormality occurs in the first control valve 231 or the second control valve 232 so that the hydraulic pressure in the first pressure chamber 112 is transmitted to both the first hydraulic circuit 201 and the second hydraulic circuit 202.

Further, the fifth control valve 235 and the sixth control valve 236 may operate to be opened when the hydraulic pressure in the wheel cylinders 40 is exited and sent to the first pressure chamber 112. This is because the first control valve 231 and the second control valve 232 provided on the second hydraulic passage 212 and the third hydraulic passage 213 are provided as a check valve allowing only one directional oil flow.

Further, the electronic brake system 1 according to an embodiment of the present disclosure may further include a first dump valve 241 and a second dump valve 242 provided on the first dump passage 116 and the second dump passage 117, respectively, to control the flow of oil. The first and second dump valves 241 and 242 may be provided as a check valve that is opened only in the direction from the reservoir 30 to the first or second pressure chamber 112 or 113 and closed in the opposite direction. That is, the first dump valve 241 may be a check valve that allows the oil to flow from the reservoir 30 to the first pressure chamber 112 while blocking the flow of oil from the first pressure chamber 112 to the reservoir 30, and the second dump valve 242 may be a check valve that allows the oil to flow from the reservoir 30 to the second pressure chamber 113 while blocking the flow of oil from the second pressure chamber 113 to the reservoir 30.

The second dump passage 117 may include a bypass passage, and a third dump valve 243 for controlling the flow of oil between the second pressure chamber 113 and the reservoir 30 may be installed on the bypass passage.

The third dump valve 243 may be provided as a solenoid valve capable of controlling the bidirectional flow, and may also be provided as a normally open type solenoid valve that operates to be closed when receiving a closing signal from the electronic control unit in a normally open state.

The hydraulic pressure providing unit 110 of the electronic brake system 1 according to an embodiment of the present disclosure may operate in a double acting manner. That is, the hydraulic pressure generated in the first pressure chamber 112 as the hydraulic piston 114 advances is transmitted to the first hydraulic circuit 201 through the first hydraulic passage 211 and the second hydraulic passage 212 to operate the wheel cylinders 40 installed on the front right wheel FR and the rear left wheel RL, and is transmitted to the second hydraulic circuit 202 through the first hydraulic passage 211 and the third hydraulic passage 213 to operate the wheel cylinders 40 installed on the rear right wheel RR and the front left wheel FL.

Likewise, the hydraulic pressure generated in the second pressure chamber 113 as the hydraulic piston 114 moves backward is transmitted to the first hydraulic circuit 201 through the fourth hydraulic passage 214 and the fifth hydraulic passage 215 to operate the wheel cylinders 40 installed on the front light wheel FR and the rear left wheel RL, and is transmitted to the second hydraulic circuit 202 through the fourth hydraulic passage 214 and the sixth hydraulic passage 216 to operate the wheel cylinders 40 installed on the rear right wheel RR and the front left wheel FL.

Further, the negative pressure generated in the first pressure chamber 112 while the hydraulic piston 114 moves backward may suck oil in the wheel cylinders 40 installed on the front right wheel FR and the rear left wheel RL and transmit the oil to the first pressure chamber 112 through the first hydraulic circuit 201, the second hydraulic passage 212 and the first hydraulic passage 211, and may suck oil in the wheel cylinders 40 installed on the rear right wheel RR and the front left wheel FL and transmit the oil to the first pressure chamber 112 through the second hydraulic circuit 202, the third hydraulic passage 213 and the first hydraulic passage 211.

Next, the motor 120 and the power converting unit 130 of the hydraulic pressure supply apparatus 100 will be described.

The motor 120 which is a device for generating a rotational force by a signal output from the electronic control unit (ECU) (not shown) may generate a rotational force in a forward or reverse direction. The rotational angular velocity and rotation angle of the motor 120 may be precisely controlled. Since the motor 120 is a well-known technology, a detailed description thereof will be omitted.

The electronic control unit controls the valves 54, 60, 76, 221a, 221b, 221c, 221d, 222a, 222b, 222c, 222d, 233, 235, 236 and 243 included in the electronic brake system 1 of the present disclosure, including the motor 120, which will be described later. The operation in which a plurality of valves is controlled according to the displacement of the brake pedal 10 will be described later.

The driving force of the motor 120 causes the displacement of the hydraulic piston 114 through the power converting unit 130, and the hydraulic pressure generated by the sliding movement of the hydraulic piston 114 in the pressure chambers is transmitted to the wheel cylinders 40 installed on the respective wheels RR, RL, FR and FL through the first and second hydraulic passages 211 and 212. A brushless motor comprising a stator 121 and a rotor 122 may be used as the motor 120.

The power converting unit 130 which is a device for converting a rotational force into a linear motion may include a worm shaft 131, a worm wheel 132, and the drive shaft 133, as an example.

The worm shaft 131 may be integrally formed with a rotation shaft of the motor 120, and rotates the worm wheel 132 by forming a worm that engages with the worm wheel 132 on the outer circumferential surface thereof. The worm wheel 132 is coupled to be engaged with the drive shaft 133 to move the drive shaft 133 linearly, and the drive shaft 133 is connected to the hydraulic piston 114 to slide the hydraulic piston 114 in the cylinder block 111.

The above operations will be described again below. A signal sensed by the pedal displacement sensor 11 as a displacement occurs in the brake pedal 10 is transmitted to the electronic control unit (ECU) (not shown), and the electronic control unit drives the motor 120 in one direction to rotate the worm shaft 131 in one direction. The rotational force of the worm shaft 131 is transmitted to the drive shaft 133 via the worm wheel 132, and the hydraulic piston 114 connected to the drive shaft 133 moves forward to generate a hydraulic pressure to the first pressure chamber 112.

On the contrary, when the pedal effort on the brake pedal 10 is released, the electronic control unit drives the motor 120 in the opposite direction to rotate the worm shaft 131 in the opposite direction. Accordingly, the worm wheel 132 also rotates in the opposite direction and the hydraulic piston 114 connected to the drive shaft 133 returns (moves backward), thereby generating a negative pressure in the first pressure chamber 112.

On the other hand, the hydraulic pressure and the negative pressure may be generated in a direction opposite to the above. That is, a signal sensed by the pedal displacement sensor 11 as a displacement occurs in the brake pedal 10 is transmitted to the electronic control unit (ECU) (not shown), and the electronic control unit drives the motor 120 in the opposite direction to rotate the worm shaft 131 in the opposite direction. The rotational force of the worm shaft 131 is transmitted to the drive shaft 133 via the worm wheel 132 and the hydraulic piston 114 connected to the drive shaft 133 moves backward, thereby generating a hydraulic pressure in the second pressure chamber 113.

On the contrary, when the pedal effort on the brake pedal 10 is released, the electronic control unit drives the motor 120 in one direction so that the worm shaft 131 rotates in one direction. Accordingly, the worm wheel 132 also rotates in the opposite direction and the hydraulic piston 114 connected to the drive shaft 133 returns (advances), thereby generating a negative pressure in the second pressure chamber 113.

As such, the hydraulic pressure supply apparatus 100 performs the function of transmitting the hydraulic pressure to the wheel cylinders 40 or sucking and transmitting the hydraulic pressure to the reservoir 30 in accordance with the rotational direction of the rotational force generated from the motor 120.

When the motor 120 rotates in one direction, a hydraulic pressure may be generated in the first pressure chamber 112 or a negative pressure may be generated in the second pressure chamber 113. In such a case, whether to brake by using the hydraulic pressure or to release the braking by using the negative pressure may be determined by controlling the valves 221a, 221b, 221c, 221d, 222a, 222b, 222c, 222d, 233, 235, 236 and 243.

Although not shown in the drawings, the power converting unit 130 may be constituted by a ball screw nut assembly. The power converting unit 130 may include, for example, a screw integrally formed with the rotation shaft of the motor 120 or connected to rotate together with the rotation shaft of the motor 120, and a ball nut that is screwed with the screw in a limited rotation state and linearly moves according to the rotation of the screw. The hydraulic piston 114 is connected to the ball nut of the power converting unit 130 and presses the pressure chambers by the linear movement of the ball nut. The structure of such a ball screw nut assembly is a publicly known apparatus for converting a rotational motion into a linear motion, and thus a detailed description thereof will be omitted.

It should be understood that the power converting unit 130 according to an embodiment of the present disclosure may adopt any structure other than the structure of the ball screw nut assembly as long as the structure may convert a rotational motion into a linear motion.

Further, the electronic brake system 1 according to an embodiment of the present disclosure may further include the first and second backup passages 251 and 252 capable of directly supplying the oil discharged from the master cylinder 20 to the wheel cylinders 40 when operating abnormally.

The first cut valve 261 for controlling the flow of oil may be provided on the first backup passage 251 and the second cut valve 262 for controlling the flow of oil may be provided on the second backup passage 252. Further, the first backup passage 251 may connect the first hydraulic pressure port 24a to the first hydraulic circuit 201, and the second backup passage 252 may connect the second hydraulic pressure port 24b and the second hydraulic circuit 202.

The first and second cut valves 261 and 262 may be provided as a normally open type solenoid valve that operates to be closed when receiving a closing signal from the electronic control unit in a normally open state.

Next, the hydraulic control unit 200 according to an embodiment of the present disclosure will be described.

The hydraulic control unit 200 may include the first hydraulic circuit 201 and the second hydraulic circuit 202, each of which receives hydraulic pressure and controls two wheels, respectively. As an example, the first hydraulic circuit 201 may control the front right wheel FR and the rear left wheel RL, and the second hydraulic circuit 202 may control the front left wheel FL and the rear right wheel RR. The wheel cylinders 40 are provided on the respective wheels FR, FL, RR, and RL to receive the hydraulic pressure and perform braking.

The first hydraulic circuit 201 is connected to the first hydraulic passage 211 and the second hydraulic passage 212 and is supplied with the hydraulic pressure from the hydraulic pressure supply apparatus 100, and the second hydraulic passage 212 is branched into two flow passages connected to the front right wheel FR and the rear left wheel RL. Likewise, the second hydraulic circuit 202 is connected to the first hydraulic passage 211 and the third hydraulic passage 213 and is supplied with the hydraulic pressure from the hydraulic pressure supply apparatus 100, and the third hydraulic passage 213 is branched into two flow passages connected to the front left wheel FL and the rear right wheel RR.

The first and second hydraulic circuits 201 and 202 may include a plurality of inlet valves 221 (221a, 221b, 221c, and 221d) to control the flow of hydraulic pressure. As an example, the first hydraulic circuit 201 may be provided with the two inlet valves 221a and 221b that are connected to the first hydraulic passage 211 to control the hydraulic pressure transmitted to the two wheel cylinders 40, respectively. Further, the second hydraulic circuit 202 may be provided with the two inlet valves 221c and 221d that are connected to the second hydraulic passage 212 to control the hydraulic pressure transmitted to the two wheel cylinders 40, respectively.

The inlet valves 221 are disposed on an upstream side of the wheel cylinders 40, and may be provided as a normally open type solenoid valve that operates to be closed when receiving a close signal from the electronic control unit in a normally open state.

The first and second hydraulic circuits 201 and 202 may include check valves 223a, 223b, 223c and 223d provided on bypass passages that connect the front and the rear of each of the inlet valves 221a, 221b, 221c and 221d. The check valves 223a, 223b, 223c and 223d may be provided to allow only the flow of oil in the direction to the hydraulic pressure providing unit 110 from the wheel cylinders 40 and to limit the flow of oil in the direction to the wheel cylinders 40 from the hydraulic pressure providing unit 110. The check valves 223a, 223b, 223c and 223d may quickly release the braking pressure of the wheel cylinders 40, and may allow the hydraulic pressure of the wheel cylinders 40 to flow into the hydraulic pressure providing unit 110 when the inlet valves 221a, 221b, 221c and 221d are not operated normally.

The first and second hydraulic circuits 201 and 202 may further include a plurality of outlet valves 222 (222a, 222b, 222c and 222d) connected to the reservoir 30 in order to improve the performance when releasing the brake. The outlet valves 222 are connected to the wheel cylinders 40, respectively, to control the hydraulic pressure that escapes from each of the wheels FL, RR, RL and FR. That is, the outlet valves 222 may sense the braking pressure of each of the wheels FL, RR, RL and FR and may be selectively opened to control the pressure when the pressure reduction braking is required.

The outlet valves 222 may be provided as a normally closed type solenoid valve that operates to be opened when receiving an open signal from the electronic control unit in a normally closed state.

The hydraulic control unit 200 may be connected to the first and second backup passages 251 and 252. As an example, the first hydraulic circuit 201 may be connected to the first backup passage 251 to be supplied with the hydraulic pressure from the master cylinder 20, and the second hydraulic circuit 202 may be connected to the second backup passage 252 to be supplied with the hydraulic pressure from the master cylinder 20.

At this time, the first backup passage 251 may join with the first hydraulic circuit 201 upstream (or downstream) of the first and second inlet valves 221a and 221b. Likewise, the second backup passage 252 may join with the second hydraulic circuit 202 upstream (or downstream) of the third and fourth inlet valves 221c and 221d. Accordingly, the hydraulic pressure provided from the hydraulic pressure supply apparatus 100 may be supplied to the wheel cylinders 40 through the first and second hydraulic circuits 201 and 202 when the first and second cut valves 261 and 262 are closed, and the hydraulic pressure provided from the master cylinder 20 may be supplied to the wheel cylinders 40 through the first and second backup passages 251 and 252 when the first and second cut valves 261 and 262 are opened. At this time, since the plurality of inlet valves 221a, 221b, 221c and 221d is in an open state, there is no need to switch the operation state.

Reference numerals "PS1-1" and "PS1-2," which are not described, are hydraulic passage pressure sensors that sense the hydraulic pressure of the first and second hydraulic circuits 201 and 202, and Reference numeral "PS2" is a backup passage pressure sensor that measures the oil pressure of the master cylinder 20. In addition, Reference numeral "MPS" is a motor control sensor that controls the rotation angle or current of the motor 120.

Hereinafter, the operation of the electronic brake system 1 according to an embodiment of the present disclosure will be described in detail.

Prior to the description, the hydraulic pressure supply apparatus 100 may be used by separating a low pressure mode and a high pressure mode. The low pressure mode and the high pressure mode may be changed by changing the operation of the hydraulic control unit 200. The hydraulic pressure supply apparatus 100 may generate a high hydraulic pressure without increasing the output of the motor 120 by using the high pressure mode. Accordingly, it is possible to secure stable braking power while lowering the price and weight of the brake system.

More specifically, the hydraulic piston 114 advances to generate the hydraulic pressure in the first pressure chamber 112. The more the hydraulic piston 114 advances in an initial state, that is, the more the stroke of the hydraulic piston 114 increases, the more the braking pressure rises as the amount of oil transferred from the first pressure chamber 112 to the wheel cylinders 40 increases. However, since an effective stroke of the hydraulic piston 114 exists, a maximum pressure due to the advancement of the hydraulic piston 114 exists.

The maximum pressure in the low pressure mode is less than the maximum pressure in the high pressure mode. However, the high pressure mode has a small rate of pressure increase per stroke of the hydraulic piston 114 as compared with the low pressure mode. This is because not all of the oil pushed out of the first pressure chamber 112 flows into the wheel cylinders 40 but a part of the oil flows into the second pressure chamber 113.

Accordingly, the low pressure mode with a large rate of pressure increase per stroke may be used in an early phase of braking where braking responsiveness is important, and the high pressure mode with high pressure may be used in a later phase of braking where the maximum braking force is important.

Hereinafter, the braking operation of the electronic brake system will be described in detail.

When the braking by a driver is started, a demanded braking amount of the driver may be sensed through information such as the pressure of the brake pedal 10 sensed by the pedal displacement sensor 11. The electronic control unit (not shown) receives the electric signal output from the pedal displacement sensor 11 and drives the motor 120.

Further, the electronic control unit may receive the magnitude of a regenerative braking amount through the backup passage pressure sensor PS2 provided at an outlet side of the master cylinder 20 and the hydraulic passage pressure sensor PS1 provided in the second hydraulic circuit 202, and may calculate the magnitude of a friction braking amount in accordance with the difference between the demanded braking amount of the driver and the regenerative braking amount to thereby grasp the magnitude of a pressure increase or a pressure decrease of the wheel cylinders 40.

When the driver depresses the brake pedal 10 at a beginning of braking, the motor 120 is operated to rotate in one direction and the rotational force of the motor 120 is transmitted to the hydraulic pressure providing unit 110 by the power converting unit 130, and the hydraulic piston 114 of the hydraulic pressure providing unit 110 advances to generate the hydraulic pressure in the first pressure chamber 112. The hydraulic pressure discharged from the hydraulic pressure providing unit 110 is transmitted to the wheel cylinders 40 provided on the four wheels through the first hydraulic circuit 201 and the second hydraulic circuit 202 to generate the braking force.

More specifically, the hydraulic pressure provided in the first pressure chamber 112 is directly transmitted to the wheel cylinders 40 provided on the two wheels FR and RL through the first hydraulic passage 211 and the second hydraulic passage 212 connected to the first communication hole 111a. At this time, the first and second inlet valves 221a and 221b, which are respectively installed on two flow passages branched from the second hydraulic passage 212, are provided in the open state. In addition, the first and second outlet valves 222a and 222b, which are respectively installed on two flow passages branched from the two flow passages branched from the second hydraulic passage 212, are maintained in the closed state to prevent the hydraulic pressure from leaking to the reservoir 30.

The hydraulic pressure provided in the first pressure chamber 112 is directly transmitted to the wheel cylinders 40 provided on the two wheels RR and FL through the first hydraulic passage 211 and the third hydraulic passage 213 connected to the first communication hole 111a. At this time, the third and fourth inlet valves 221c and 221d, which are respectively installed on two flow passages branched from the third hydraulic passage 213, are provided in the open state. In addition, the third and fourth outlet valves 222c and 222d, which are respectively installed on two flow passages branched from the two flow passages branched from the third hydraulic passage 213, are maintained in the closed state to prevent the hydraulic pressure from leaking to the reservoir 30.

The fifth control valve 235 and the sixth control valve 236 may be switched to the open state to open the seventh hydraulic passage 217 and the eighth hydraulic passage 218. As the seventh hydraulic passage 217 and the eighth hydraulic passage 218 are opened, the second hydraulic passage 212 and the third hydraulic passage 213 communicate with each other. However, at least one of the fifth control valve 235 and the sixth control valve 236 may be maintained in the closed state as necessary.

Also, the third control valve 233 may be maintained in the closed state to block the fifth hydraulic passage 215. Through this, the hydraulic pressure generated in the first pressure chamber 112 is blocked from being transmitted to the second pressure chamber 113 through the fifth hydraulic passage 215 connected to the second hydraulic passage 212, thereby increasing the rate of pressure increase per stroke. Therefore, a quick braking response may be expected at the beginning of braking.

Meanwhile, if the pressure transmitted to the wheel cylinders 40 is measured to be higher than a target pressure value in accordance with a pedal effort of the brake pedal 10, the electronic control unit may open one or more of the first to fourth outlet valves 222 to control so as to follow the target pressure value.

Also, when the hydraulic pressure is generated in the hydraulic pressure supply apparatus 100, the first and second cut valves 261 and 262 provided on the first and second backup passages 251 and 252 connected to the first and second hydraulic pressure ports 24a and 24b of the master cylinder 20 are closed so that the hydraulic pressure discharged from the master cylinder 20 is not transmitted to the wheel cylinders 40.

Also, the pressure generated by the pressing of the master cylinder 20 according to the pedal effort of the brake pedal 10 is transmitted to the simulation apparatus 50 connected to the master cylinder 20. At this time, the normally closed type simulator valve 54 disposed at the front end of the simulation chamber 51 is opened so that the oil filled in the simulation chamber 51 is delivered to the reservoir 30 through the simulator valve 54. In addition, the reaction force piston 52 moves so that a pressure corresponding to the load of the reaction force spring 53 supporting the reaction force piston 52 is formed in the simulation chamber 51, thereby providing a proper pedal feeling to the driver.

The hydraulic passage pressure sensor PS1-2 or PS1-1 may detect the flow rate delivered to the wheel cylinder 40 installed on the front left wheel FL or the rear right wheel RR (hereinafter, simply referred to as the wheel cylinder 40). Accordingly, the flow rate delivered to the wheel cylinder 40 may be controlled by controlling the hydraulic pressure supply apparatus 100 in accordance with the output of the hydraulic passage pressure sensor PS1-2. Specifically, the flow rate discharged from the wheel cylinder 40 and the discharge speed may be controlled by regulating the advancing distance and the advancing speed of the hydraulic piston 114.

On the other hand, it is possible to switch from the low pressure mode to the high pressure mode before the hydraulic piston 114 advances to the maximum.

In the high pressure mode, the third control valve 233 may be switched to the open state to open the fifth hydraulic passage 215. Accordingly, the hydraulic pressure generated in the first pressure chamber 112 is transmitted to the second pressure chamber 113 through the fifth hydraulic passage 215 connected to the second hydraulic passage 212 to be used to push out the hydraulic piston 114.

In the high pressure mode, since a part of the oil pushed out of the first pressure chamber 112 flows into the second pressure chamber 113, the rate of pressure increase per stroke decreases. However, since a part of the hydraulic pressure generated in the first pressure chamber 112 is used to push out the hydraulic piston 114, the maximum pressure is increased. At this time, the reason why the maximum pressure is increased is that the volume per stroke of the hydraulic piston 114 in the second pressure chamber 113 is smaller than the volume per stroke of the hydraulic piston 114 in the first pressure chamber 112.

Next, a case of releasing the braking force in the braking state in the normal operation of the electronic brake system 1 according to an embodiment of the present disclosure will be described.

When the pedal effort applied to the brake pedal 10 is released, the motor 120 generates a rotational force in a direction opposite to the braking direction and transmits the rotational force to the power converting unit 130, and the worm shaft 131, the worm wheel 132 and the drive shaft 133 of the power converting unit 130 are rotated in the opposite direction to the braking direction to move the hydraulic piston 114 back to its original position, so that the pressure in the first pressure chamber 112 is released or a negative pressure is generated in the first pressure chamber 112. In addition, the hydraulic pressure providing unit 110 receives the hydraulic pressure discharged from the wheel cylinders 40 through the first and second hydraulic circuits 201 and 202 and transmits the hydraulic pressure to the first pressure chamber 112.

More specifically, the negative pressure generated in the first pressure chamber 112 releases the pressure of the wheel cylinders 40, which are provided on the two wheels FR and RL, through the first hydraulic passage 211 and the second hydraulic passage 212 connected to the first communication hole 111a. At this time, the first and second inlet valves 221a and 221b, which are respectively installed on two flow passages branched from the second hydraulic passage 212, are provided in the open state. In addition, the first and second outlet valves 222a and 222b, which are respectively installed on two flow passages branched from the two flow passages branched from the second hydraulic passage 212, are maintained in the closed state to prevent oil in the reservoir 30 from being introduced.

Also, the negative pressure generated in the first pressure chamber 112 releases the pressure of the wheel cylinders 40, which are provided on the two wheels FL and RR, through the first hydraulic passage 211 and the third hydraulic passage 213 connected to the first communication hole 111a. At this time, the third and fourth inlet valves 221c and 221d, which are respectively installed on two flow passages branched from the third hydraulic passage 213, are provided in the open state. In addition, the third and fourth outlet valves 222c and 222d, which are respectively installed on two flow passages branched from the third hydraulic passage 213, are maintained in the closed state to prevent oil in the reservoir 30 from being introduced.

The third control valve 233 is switched to the open state to open the fifth hydraulic passage 215, the fifth control valve 235 is switched to the open state to open the seventh hydraulic passage 217, and the sixth control valve 236 is switched to the open state to open the eighth hydraulic passage 218. As the fifth hydraulic passage 215, the seventh hydraulic passage 217 and the eighth hydraulic passage 218 communicate with each other, the first pressure chamber 112 and the second pressure chamber 113 communicate with each other.

On the other hand, in order for a negative pressure to be formed in the first pressure chamber 112, the hydraulic piston 114 must move backward, but if oil is fully filled in the second pressure chamber 113, a resistance is generated when the hydraulic piston 114 is reversed. Accordingly, when the third control valve 233, the fifth control valve 235 and the sixth control valve 236 are opened so that the fourth hydraulic passage 214 and the fifth hydraulic passage 215 are communicated with the second hydraulic passage 212, the oil in the second pressure chamber 113 is moved to the first pressure chamber 112.

The third dump valve 243 may be switched to the closed state. By closing the third dump valve 243, the oil in the second pressure chamber 113 may be discharged only to the fourth hydraulic passage 214. However, in some cases, the third dump valve 243 may be maintained in the open state so that the oil in the second pressure chamber 113 may flow into the reservoir 30.

On the other hand, in a case where the negative pressure transmitted to the first and second hydraulic circuits 201 and 202 is measured to be higher than a target pressure release value corresponding to the release amount of the brake pedal 10, the electronic control unit may open one or more of the first to fourth outlet valves 222 to control so as to follow the target pressure value.

Also, when a hydraulic pressure is generated in the hydraulic pressure supply apparatus 100, the first and second cut valves 261 and 262 provided on the first and second backup passages 251 and 252 connected to the first and second hydraulic pressure ports 24a and 24b of the master cylinder 20 are closed so that the negative pressure generated in the master cylinder 20 is not transmitted to the hydraulic control unit 200.

In the high pressure mode, since the oil in the second pressure chamber 113 is moved to the first pressure chamber 112 together with the oil in the wheel cylinders 40 by the negative pressure in the first pressure chamber 112 generated as the hydraulic piston 114 moves backward, the pressure reduction rate of the wheel cylinders 40 is small. Therefore, it may be difficult to release the pressure quickly in the high pressure mode.

For this reason, the high pressure mode may only be used in high pressure situations and may be switched to the low pressure mode if the pressure falls below a certain level.

Next, a state in which the electronic brake system 1 according to an embodiment of the present disclosure is actuated by an ABS will be described. In this embodiment, for example, the wheel cylinders 40 disposed on the front left wheel FL and the front right wheel FR are operated by the ABS, but the present disclosure is not limited thereto.

When the motor 120 operates according to the pedal effort of the brake pedal 10, a hydraulic pressure is generated as the rotational force of the motor 120 is transmitted to the hydraulic pressure providing unit 110 through the power converting unit 130. At this time, the first and second cut valves 261 and 262 are closed so that the hydraulic pressure discharged from the master cylinder 20 is not transmitted to the wheel cylinders 40.

The hydraulic piston 114 advances to generate the hydraulic pressure in the first pressure chamber 112, the fourth inlet valve 221d is provided in the open state and the hydraulic pressure transmitted through the first hydraulic passage 211 and the third hydraulic passage 213 actuates the wheel cylinder 40 disposed on the front left wheel FL, thereby generating a braking force.

At this time, the first to third inlet valves 221a, 221b and 221c are switched to the closed state, and the first to fourth outlet valves 222a, 222b, 222c and 222d are maintained in the closed state. In addition, the third dump valve 243 is provided in the open state so that the oil is filled from the reservoir 30 to the second pressure chamber 113.

Also, the hydraulic pressure piston 114 moves backward to generate the hydraulic pressure in the second pressure chamber 113, the first inlet valve 221a is provided in the open state and the hydraulic pressure transmitted through the fourth hydraulic passage 214 and the second hydraulic passage 212 actuates the wheel cylinder 40 disposed in the front right wheel FR, thereby generating a braking force.

At this time, the second to fourth inlet valves 221b, 221c and 221d are switched to the closed state, and the first to fourth outlet valves 222a, 222b, 222c and 222d are maintained in the closed state.

That is, the electronic brake system 1 according to an embodiment of the present disclosure can independently control the operation of the motor 120 and the respective valves 221a, 221b, 221c, 221d, 222a, 222b, 222c, 222d, 233, 235, 236 and 243 so that the hydraulic pressure may be selectively transmitted to or discharged from the wheel cylinders 40 of the wheels RL, RR, FL and FR according to the required pressure, and thus precise pressure control becomes possible.

Next, a case where the electronic brake system 1 as above does not operate normally (fallback mode) will be described.

In a case where the electronic brake system 1 is operated abnormally, the respective valves 54, 60, 221a, 221b, 221c, 221d, 222a, 222b, 222c, 222d, 233, 235, 236 and 243 are provided in an initial state of braking which is in a non-operating state.

When a driver presses the brake pedal 10, the input rod 12 connected to the brake pedal 10 advances, at the same time the first piston 21a in contact with the input rod 12 advances, and the second piston 22a also advances by the pressing or movement of the first piston 21a. At this time, since there is no gap between the input rod 12 and the first piston 21a, rapid braking may be performed.

The hydraulic pressure discharged from the master cylinder 20 by the pressurization or movement of the first piston 21a and the second piston 21b is directly transmitted to the wheel cylinders 40 through the first and second backup passages 251 and 252 connected for a backup brake, thereby performing the braking force.

At this time, the first and second cut valves 261 and 262 provided on the first and second backup passages 251 and 252 and the inlet valves 221 for opening and closing the flow passages of the first and second hydraulic circuits 201 and 202 are provided as normally open type solenoid valves, and the simulator valve 54 and the outlet valves 222 are provided as normally closed type solenoid valves, and thus the hydraulic pressure is immediately transmitted to the four wheel cylinders 40. Therefore, since stable braking may be performed, the braking stability is improved.

The electronic brake system 1 according to an embodiment of the present disclosure may effectively discharge only the braking pressure provided to the corresponding wheel cylinders 40 through the first to fourth outlet valves 222a to 222d.

For example, in a case where the first to fourth inlet valves 221a to 221d are switched to the closed state, the first to third outlet valves 222a to 222c are maintained in the closed state, and the fourth outlet valve 222d is switched to the open state, the hydraulic pressure discharged from the wheel cylinder 40 provided on the front left wheel FL is discharged to the third reservoir chamber 33 through the fourth outlet valve 222d.

The reason why the hydraulic pressure in the wheel cylinders 40 is discharged through the outlet valves 222 is because the pressure in the reservoir 30 is smaller than the pressure in the wheel cylinders 40. The pressure in the reservoir 30 is usually provided at atmospheric pressure. Since the pressure in the wheel cylinders 40 is usually significantly higher than the atmospheric pressure, the hydraulic pressure in the wheel cylinders 40 is quickly discharged to the reservoir 30 when the outlet valves 222 are opened.

On the other hand, the fourth outlet valve 222d is opened to discharge the hydraulic pressure of the corresponding wheel cylinder 40, and at the same time in a case where the first to third inlet valves 221a to 221c are switched to in the open state, the hydraulic pressure may be supplied to the remaining three wheels FR, RL and RR.

The flow rate discharged from the wheel cylinders 40 increases as the difference between the pressure in the wheel cylinders 40 and the pressure in the first pressure chamber 112 increases. As an example, the greater the volume of the first pressure chamber 112 as the hydraulic piston 114 moves backward, the larger the flow rate may be discharged from the wheel cylinders 40.

As such, the electronic control unit independently controls the respective valves 221a, 221b, 221c, 221d, 222a, 222b, 222c, 222d, 233, 235, 236 and 243, so that the hydraulic pressure may be selectively transmitted to or discharged from the wheel cylinders 40 of the wheels RL, RR, FL and FR according to the required pressure, thereby performing precise pressure control.

Although the hydraulic pressure generating operation when the hydraulic piston 114 advances is exemplified as an example in the above embodiment, the present disclosure is not limited thereto. For example, the operation may be controlled so that the hydraulic pressure and the negative pressure may be generated in the first pressure chamber 112 and the second pressure chamber 113, respectively, even when the hydraulic piston 114 retracts.

Next, a state in which the electronic brake system 1 according to an embodiment of the present disclosure is operated in an inspection mode will be described.

In a case where the electronic brake system 1 operates abnormally, the respective valves 54, 60, 221a, 221b, 221c, 221d, 222a, 222b, 222c, 222d, 233, 235, 236 and 243 are provided in an initial state of braking which is in a non-operating state, and the first and second cut valves 261 and 262 provided on the first and second backup passages 251 and 252 and the inlet valves 221 provided on an upstream side of the wheel cylinders 40 provided on the respective wheels RR, RL, FR and FL are opened, so that the hydraulic pressure is immediately transmitted to the wheel cylinders 40.

At this time, the simulator valve 54 is provided in the closed state so that the hydraulic pressure transmitted to the wheel cylinders 40 through the first backup passage 251 is prevented from leaking to the reservoir 30 through the simulation apparatus 50. Therefore, when a driver depresses the brake pedal 10, the hydraulic pressure discharged from the master cylinder 20 is transmitted to the wheel cylinders 40 without loss, thereby ensuring stable braking.

However, when a leak occurs in the simulator valve 54, a part of the hydraulic pressure discharged from the master cylinder 20 may be lost to the reservoir 30 through the simulator valve 54. The simulator valve 54 is provided to be closed in an abnormal mode, but in this case, the hydraulic pressure discharged from the master cylinder 20 pushes the reaction force piston 52 of the simulation apparatus 50, so that leakage may occur in the simulator valve 54 by the pressure formed at the rear end of the simulation chamber 51.

In this way, in a case where leakage occurs in the simulator valve 54, the driver does not obtain the intended braking force, thereby causing a problem in braking stability.

The inspection mode is a mode for generating a hydraulic pressure in the hydraulic pressure supply apparatus 100 to inspect whether there is a loss of pressure in order to inspect whether leakage occurs in the simulator valve 54. If the hydraulic pressure discharged from the hydraulic pressure supply apparatus 100 flows into the reservoir 30 and pressure loss occurs, it is difficult to know whether or not leakage has occurred in the simulator valve 54.

Therefore, in the inspection mode, the hydraulic circuit connected to the hydraulic pressure supply apparatus 100 may be constituted as a closed circuit by closing the inspection valve 60. That is, by closing the inspection valve 60, the simulator valve 54 and the outlet valves 222, the flow passages connecting the hydraulic pressure supply apparatus 100 and the reservoir 30 may be blocked to constitute a closed circuit.

The electronic brake system 1 according to an embodiment of the present disclosure may provide hydraulic pressure only to the first backup passage 251 to which the simulation apparatus 50 is connected among the first and second backup passages 251 and 252 in the inspection mode. Accordingly, in order to prevent the hydraulic pressure discharged from the hydraulic pressure supply apparatus 100 from being transmitted to the master cylinder 20 along the second backup passage 252, the second cut valve 262 may be switched to the closed state in the inspection mode. In addition, by maintaining the fifth control valve 235 which connects the first hydraulic circuit 201 and the second hydraulic circuit 202 in the closed state and closing the sixth control valve 236 which communicates with the fifth hydraulic passage 215 and the second hydraulic passage 212, the hydraulic pressure in the second pressure chamber 113 may be prevented from leaking to the first pressure chamber 112.

In the inspection mode, in the initial state of the valves 54, 60, 221a, 221b, 221c, 221d, 222a, 222b, 222c, 222d, 233, 235, 236 and 243 included in the electronic brake system 1 of the present disclosure, the first to fourth inlet valves 221a to 221d and the second cut valve 262 are switched to the closed state, and the first cut valve 261 and the third control valve 233 are maintained in the open state, so that the hydraulic pressure generated in the hydraulic pressure supply apparatus 100 may be transmitted to the master cylinder 20.

The hydraulic pressure of the hydraulic pressure supply apparatus 100 may be prevented from being transmitted to the first and second hydraulic circuits 201 and 202 by closing the inlet valves 221, the hydraulic pressure of the hydraulic pressure supply apparatus 100 may be prevented from circulating along the first backup passage 251 and the second backup passage 252 by switching the second cut valve 262 to the closed state, and the hydraulic pressure supplied to the master cylinder 20 may be prevented from leaking to the reservoir 30 by switching the inspection valve 60 to the closed state.

In the inspection mode, after generating the hydraulic pressure in the hydraulic pressure supply apparatus 100, the electronic control unit may analyze a signal transmitted from the backup passage pressure sensor PS2 that measures the oil pressure in the master cylinder 20 and sense a state in which leakage occurs in the simulator valve 54. As an example, as a result of the measurement of the backup passage pressure sensor PS2, it may be determined that the simulator valve 54 is not leaking when there is no loss, and it may be determined that there is a leak in the simulator valve 54 when a loss occurs.

The inspection mode may be executed in a preset condition through the electronic control unit during running or stopping.

According to the embodiment of the present disclosure, if the electronic brake system 1 is not operated normally and a system error occurs, the vehicle may lose its braking capability.

In the present embodiment, the braking operation of the electronic brake system 1 may be performed by using the hydraulic pressure generating apparatus 70 described above to prevent loss of the braking capability. Hereinafter, the operation of the hydraulic pressure generating apparatus 70 will be described.

FIG. 5 is a diagram for explaining the operation of the hydraulic pressure generating apparatus 70 if a system error occurs. Referring to FIG. 5, when the electronic brake system 1 does not operate normally, the valves 54, 60, 221a, 221b, 221c, 221d, 222a, 222b, 222c, 222d, 233, 235, 236 and 243 maintain an initial braking state, which is in a non-operating state, and the first and second cut valves 261 and 262 provided in the first and second backup passages 251 and 252, 262 also maintain an initial braking state, which is the non-operating state.

That is, the inlet valve 221 provided on an upstream side of the wheel cylinder 40 provided in each of the wheels RR, RL, FR and FL maintains the open state, and the first and second cut valves 261 and 262 also maintain the open state.

Accordingly, if a system error is detected, the electronic control unit generates a rotational force to the motor 72 to drive the pump 71, and the pump 71 supplies the fluid in the reservoir 30 to the second master chamber 20b of the master cylinder 20 through the second reservoir passage 35. The hydraulic pressure discharged from the second master chamber 20b of the master cylinder 20 is transmitted to the wheel cylinders 40, particularly to the wheel cylinders 40 provided on the two wheels FL and RR through the second backup passage 252 and the third hydraulic passage 213, which are opened, to generate the braking force. At this time, the normally open type solenoid valve 76 is switched to the closed state so that the flow of the oil flowing into the reservoir 30 from the second master chamber 20b is blocked.

When the hydraulic pressure generating apparatus 70 is operated, the hydraulic pressure in the first master chamber 20a of the master cylinder 20 generated by the pressing of the brake pedal 10 in accordance with the fallback mode described above may be transmitted to the wheel cylinders 40, particularly to the wheel cylinders 40 provided on the two wheels FR and RL through the first backup passage 252 and the second hydraulic passage 212.

Accordingly, finally, all of the four wheel cylinders 40 are supplied with the hydraulic pressure from the hydraulic pressure generating apparatus 70 and the brake pedal 10, respectively, so that stable braking of the vehicle becomes possible.

On the other hand, when the hydraulic pressure generating apparatus 70 is provided on the second reservoir passage 35 as in the present embodiment, the check valve 75 and the solenoid valve 76 of the hydraulic pressure generating apparatus 70 may be operated in the second inspection mode in the same manner as the inspection valve 60 and the check valve 61 provided on the first reservoir passage 34. That is, since the second backup passage 252 connecting the hydraulic pressure supply apparatus 100 and the reservoir 30 may be constituted as a closed circuit when the check valve 75 and the solenoid valve 76 of the hydraulic pressure generating apparatus 70 are used, it is possible to determine whether the closed circuit is leaking by analyzing the pressure signal transmitted from the backup hydraulic passage pressure sensor PS2. This is different from the first inspection mode described above, which determines whether or not the simulator valve 54 provided on the first backup passage 251 is leaking by constituting the first backup passage 251 as a closed circuit by using the inspection valve 60.

Although not specifically shown in the drawing, the hydraulic pressure generating apparatus 70 may be provided in the first reservoir passage 34.

That is, the electronic control unit generates a rotational force to the motor 72 to drive the pump 71, and the pump 71 supplies the fluid in the reservoir 30 to the first master chamber 20a of the master cylinder 20 through the first reservoir passage 34, and the hydraulic pressure discharged from the first master chamber 20a of the master cylinder 20 is transmitted to the wheel cylinders 40, particularly to the wheel cylinders 40 provided on the two wheels FR and RL through the first backup passage 251 and the second hydraulic passage 212 to generate the braking force.

Accordingly, the electronic brake system 1 according to the present embodiment may transmit hydraulic pressure to at least two of the wheel cylinders 40 even in an abnormal state so that emergency braking may be realized.

FIG. 6 is a view illustrating an electronic brake system according to another embodiment of the present disclosure. The present embodiment will be described mainly on the points different from the above embodiment, and the same reference numerals denote the same elements, and thus a detailed description thereof will be omitted.

According to the present embodiment, the hydraulic pressure generating apparatus 70 may be provided on the second reservoir passage 35 as in the above embodiment, and the hydraulic pressure generating apparatus 7o may further a pump 71' provided on the first reservoir passage 34. The pump 71' provided on the first reservoir passage 34 and the pump 71 provided on the second reservoir passage 35 may be installed to be driven by the single motor 72 by using an eccentric cam (not shown) provided on the motor shaft.

If a system error occurs, the electronic control unit generates a rotational force to the motor 72 to drive the pump 71 and the pump 71'. The pump 71 supplies the fluid in the reservoir 30 to the second master chamber 20b of the master cylinder 20 through the second reservoir passage 35, and the pump 71' supplies the fluid in the reservoir 30 to the first master chamber 20a of the master cylinder 20 through the first reservoir passage 34.

The hydraulic pressure discharged from the second master chamber 20b of the master cylinder 20 is transmitted to the wheel cylinders 40 provided on the two wheels FL and RR through the second backup passage 252 and the third hydraulic passage 213, and the hydraulic pressure discharged from the first master chamber 20a of the master cylinder 20 is transmitted to the wheel cylinders 40 provided on the two wheels FR and RL through the first backup passage 251 and the second hydraulic passage 212, so that the braking force may be provided on all of four wheel cylinders 40.

As is apparent from the above, the electronic brake system according to the embodiments of the present disclosure can quickly achieve braking performance because if the system fails to operate normally and an error occurs, hydraulic pressure can be alternatively supplied to the wheel cylinders using an auxiliary hydraulic pressure generating apparatus.

Further, the electronic brake system according to the embodiments of the present disclosure can achieve alternative braking because hydraulic pressure can be supplied to at least two of the wheel cylinders in an emergency by providing the hydraulic pressure generating apparatus on at least one of the first reservoir passage and the second reservoir passage between the reservoir and the master cylinder.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An electronic brake system comprising:
a reservoir to store oil;
a master cylinder connected to the reservoir and including first and second master chambers and first and second piston provided in the first and second master chambers, respectively, to discharge the oil according to a pedal effort of a brake pedal;
a hydraulic pressure generating apparatus provided on at least one of a first reservoir passage connecting the reservoir and the first master chamber and a second reservoir passage connecting the reservoir and the second master chamber;
a hydraulic pressure supply apparatus operated by an electrical signal to generate a hydraulic pressure; and
a hydraulic pressure control unit transmitting alternatively the hydraulic pressure discharged from the hydraulic pressure generating apparatus or the hydraulic pressure supply apparatus to a wheel cylinder provided on each of four wheels, wherein the hydraulic pressure discharged from the hydraulic pressure supply apparatus is transmitted to the wheel cylinder in a normal operation of the electronic brake system, and the hydraulic pressure discharged from the hydraulic pressure generating apparatus is transmitted to the wheel cylinder in response to an abnormal operation of the electronic brake system.

2. The electronic brake system according to claim 1,
wherein the hydraulic pressure generating apparatus comprises:
a motor;
a pump operated by the motor and provided on at east one of the first reservoir passage and the second reservoir passage;
a first bypass passage connecting a front side and a rear side of the pump;
a second bypass passage connecting the front side and the rear side of the pump;
a solenoid valve provided on one of the first bypass passage and the second bypass passage; and
a check valve provided on the other one of the first bypass passage and the second bypass passage to allow the flow of oil from the reservoir to the master cylinder and block the flow of oil from the master cylinder to the reservoir.

3. The electronic brake system according to claim 2,
wherein the solenoid valve is provided as a normally open type valve thich is opened in a normal state and is operated to be closed during the operation of the pump.

4. The electronic brake system according to claim 2,
wherein the hydraulic pressure generating apparatus is provided on the second reservoir passage.

5. The electronic brake system according to claim 4,
wherein a check valve and an inspection valve for an inspection mode are provided on the first reservoir passage.

6. The electronic brake system according to claim 4,
wherein the solenoid valve of the hydraulic pressure generating apparatus is provided as a normally open type valve which is opened in a normal state and performs an inspection mode by a closing operation.

7. The electronic brake system according to claim 1,
wherein the hydraulic pressure generating apparatus comprises pumps provided on each of the first reservoir passage and the second reservoir passage, and the pumps are driven by a single motor.

8. An electronic brake system comprising:
a reservoir to store oil;
a master cylinder connected to the reservoir and including first and second master chambers and first and second piston provided in the first and second master chambers, respectively, to discharge the oil according to a pedal effort of a brake pedal;
a hydraulic pressure generating apparatus provided on at least one of a first reservoir passage connecting the reservoir and the first master chamber and a second reservoir passage connecting the reservoir and the second master chamber;
a hydraulic pressure supply apparatus operated by an electrical signal to generate a hydraulic pressure; and
a hydraulic pressure control unit transmitting the hydraulic pressure discharged from the hydraulic pressure generating apparatus or the hydraulic pressure supply apparatus to a wheel cylinder provided on each of four wheels,
wherein the hydraulic pressure generating apparatus comprises pumps provided on each of the first reservoir passage and the second reservoir passage, and the pumps are driven by a single motor.

9. The electronic brake system according to claim 8,
wherein the hydraulic pressure generating apparatus further comprises:
a first bypass passage connecting a front side and a rear side of the pump provided on the second reservoir passage;
a second bypass passage connecting the front side and the rear side of the pump provided on the second reservoir passage;
a solenoid valve provided on one of the first bypass passage and the second bypass passage; and
a check valve provided on the other one of the first bypass passage and the second bypass passage to allow the flow of oil from the reservoir to the master cylinder and block the flow of oil from the master cylinder to the reservoir.

10. The electronic brake system according to claim 9, wherein the solenoid valve is provided as a normally open type valve which is opened in a normal state and is operated to be closed during the operation of the pump.

11. The electronic brake system according to claim 8, wherein a check valve and an inspection valve for an inspection mode are provided on the first reservoir passage.

12. An electronic brake system comprising:
a reservoir to store oil;
a master cylinder connected to the reservoir and including first and second master chambers and first and second piston provided in the first and second master chambers, respectively, to discharge the oil according to a pedal effort of a brake pedal;
a hydraulic pressure generating apparatus provided on at least one of a first reservoir passage connecting the reservoir and the first master chamber and a second reservoir passage connecting the reservoir and the second master chamber;
a hydraulic pressure supply apparatus operated by an electrical signal to generate a hydraulic pressure; and
a hydraulic pressure control unit transmitting alternatively the hydraulic pressure discharged from the hydraulic pressure generating apparatus or the hydraulic pressure supply apparatus to a wheel cylinder provided on each of four wheels,
wherein the hydraulic pressure control unit is separately provided with a first hydraulic circuit and a second hydraulic circuit for transmitting hydraulic pressure discharged from the hydraulic pressure supply apparatus to wheel cylinders provided on two wheels respectively,
the reservoir includes a first reservoir chamber connected to recover oil dumped from the first hydraulic circuit, a second reservoir chamber connected to supply oil to the hydraulic pressure supply apparatus, and a third reservoir chamber connected to recover oil dumped from the second hydraulic circuit, and
the first reservoir chamber and the third reservoir chamber are separately provided from each other.

13. The electronic brake system according to claim 12, wherein the first reservoir chamber is connected with the first reservoir passage, and the third reservoir chamber is connected with the second reservoir passage.

14. The electronic brake system according to claim 12, wherein the hydraulic pressure generating apparatus comprises:
a motor;
a pump operated by the motor and provided on at ast one of the first reservoir passage and the second reservoir passage;
a first bypass passage connecting a front side and a rear side of the pump;
a second bypass passage connecting the front side and the rear side of the pump;
a solenoid valve provided on one of the first bypass passage and the second bypass passage; and
a check valve provided on the other one of the first bypass passage and the second bypass passage to allow the flow of oil from the reservoir to the master cylinder and block the flow of oil from the master cylinder to the reservoir.

15. The electronic brake system according to claim 14, wherein the solenoid valve is provided as a normally open type valve which is opened in a normal state and is operated to be closed during the operation of the pump.

16. The electronic brake system according to claim 12, wherein the hydraulic pressure generating apparatus is provided on the second reservoir passage.

17. The electronic brake system according to claim 12, wherein a check valve and an inspection valve for an inspection mode are provided on the first reservoir passage.

18. The electronic brake system according to claim 12, wherein the hydraulic pressure discharged from the hydraulic pressure supply apparatus is transmitted to the wheel cylinder in a normal operation of the electronic brake system, and the hydraulic pressure discharged from the hydraulic pressure generating apparatus is transmitted to the wheel cylinder in response to an abnormal operation of the electronic brake system.

19. The electronic brake system according to claim 12, wherein the hydraulic pressure generating apparatus comprises pumps provided on each of the first reservoir passage and the second reservoir passage, and the pumps are driven by a single motor.

20. The electronic brake system according to claim 19, wherein the hydraulic pressure generating apparatus further comprises:
a first bypass passage connecting a front side and a rear side of the pump provided on die second reservoir passage;
a second bypass passage connecting the front side and the rear side of the pump provided on the second reservoir passage;
a solenoid valve provided on one of the first bypass passage and the second bypass passage; and
a check valve provided on the other one of the first bypass passage and the second bypass passage to allow the flow of oil from the reservoir to the master cylinder and block the flow of oil from the master cylinder to the reservoir.

* * * * *